(12) United States Patent
Nakamura et al.

(10) Patent No.: US 6,657,822 B1
(45) Date of Patent: Dec. 2, 2003

(54) MAGNETIC DISK APPARATUS

(75) Inventors: Gentaro Nakamura, Odawara (JP);
Nobuyuki Okunaga, Odawara (JP);
Toshihisa Okazaki, Odawara (JP); Isao Kobayashi, Odawara (JP); Toshihiro Arisaka, Odawara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/579,522

(22) Filed: May 26, 2000

(30) Foreign Application Priority Data

Nov. 25, 1999  (JP) .......................................... 11-334748

(51) Int. Cl.$^7$ ................................................ G11B 5/60
(52) U.S. Cl. .................................................. 360/265.6
(58) Field of Search ........................... 360/265.6, 265.2; 310/51, 90

(56) References Cited

U.S. PATENT DOCUMENTS 4,717,977 A * 1/1988 Brown ........................ 360/135
5,446,608 A * 8/1995 Sanada ...................... 360/265.2
6,185,067 B1 * 2/2001 Chamberlain ............ 360/99.08

* cited by examiner

Primary Examiner—George J. Letscher
(74) Attorney, Agent, or Firm—Antonelli, Terry, Stout & Kraus, LLP

(57) ABSTRACT

A magnetic disk apparatus includes a magnetic disk, a magnetic head for writing data into and reading data from the magnetic disk, a carriage pivoted on a pivot bearing while holding the magnetic head at its one end, the pivot bearing being constituted by a cylindrical sleeve serving as a fixed axle, bearing units each having an outer race fitted to the inside of the sleeve, bearing balls, and an inner race, and a shaft having the outside fitted to the inner races of the bearing units, thus, change of a pre-load caused by a heat expansion difference between the shaft and sleeve is an axial direction is compensated with a change of a pre-load caused thereby the same is a radius direction. Hence, the weight of a pivotally movable portion of an actuator is reduced.

22 Claims, 4 Drawing Sheets

RELATION BETWEEN SPECIFIC GRAVITY OR SLEEVE AND MAIN RESONANCE FREQUENRY

MAGNETIC DISK APPARATUS

BACKGROUND OF THE INVENTION

1. Field of the Invention

The present invention relates to a magnetic disk apparatus provided with a rotating actuator and particularly to a magnetic disk apparatus provided with a rotating actuator in which the influence of thermal expansion is reduced so that high-density recording may be performed.

2. Description of the Related Art

As shown in FIG. 1, generally, a magnetic disk apparatus is provided with a magnetic disk 5 for recording and reproducing data, a magnetic head 4 provided at an end of a carriage 3 pivoted on a pivot bearing 2, and a voice coil motor (VCM) having a magnet 6 called actuator for controlling Lorentz force by use of a current flowing in a coil 7 to thereby rotate the carriage 3. The magnet 6 rotates the carriage 3 so that data recording/reproducing may be performed in the condition that the magnetic head 4 is positioned above an optional track on the magnetic disk 5.

The controllability of the actuator is affected by a resonance frequency inherent in the structure of the actuator. It is known that the controllability is enhanced more greatly as lowest resonance frequency (main resonance frequency) in a pivotal moving direction which is a controlling direction becomes higher.

The structure of the actuator is as shown in FIGS. 2A and 2B. The actuator is constituted of: a columnar shaft 23 serving as a center of rotation; a cylindrical sleeve 21; a pair of bearing units 22 having outer races 222 fitted to upper and lower positions of the sleeve 21, and inner races 221 fitted to the outer side of the shaft 23 through bearing balls 223; and a carriage 3 fitted to the sleeve 21 and having one end connected to the magnetic head, and the other end connected to a coil.

As shown in FIG. 2B which is an enlarged view of a portion A of FIG. 2A, each of the bearing units 22 has bearing balls 223 put in both recesses provided in the inside of the bearing outer and inner races 222 and 221. Each of the bearing units 22 is attached in the condition that the bearing outer race 222 is preloaded with a pressure P acting upward in FIG. 2B.

Because the stiffness of the bearing unit 22 becomes lowest in a pivotal moving direction of the actuator configured as described above, the characteristic frequency of a spring-mass system having the stiffness of the bearing unit 22 as a spring and mass of a movable portion of the actuator as mass serves as a main resonance frequency. This can be expressed as a model shown in FIG. 3.

As shown in FIG. 3, when the stiffness of the shaft 23 connecting a spring and a stationary portion to each other is sufficiently high, the characteristic frequency f is given by the expression:

$$f = 1/2/\pi \sqrt{(k/m)}$$

in which k is a spring constant of the spring, and m is a mass of the movable portion of the actuator. Accordingly, it is understood that the controllability of the actuator can be enhanced by reduction of the mass m, that is, by reduction of the mass of the movable portion of the actuator. On the other hand, when the stiffness of the shaft 23 is low, the stiffness of the shaft 23 has influence on the main resonance frequency.

Generally, parts (races, rollers, etc.) of the bearing unit 22 used for the magnetic disk apparatus are in most cases made of stainless steel from the point of view of stiffness and corrosion resistance. Heretofore, the same material as that of the bearing unit 22 is applied to the sleeve 21 and the shaft 23 in order to avoid the change of the pre-load due to the change of the temperature of the pivot bearing 2 in accordance with the difference in thermal expansion coefficient between the sleeve 21 and the bearing unit 22 and between the sleeve 21 and the shaft 23.

The structure of the actuator has characteristic as follows. When the pre-load decreases, the stiffness of the bearing unit 22 (that is, the pressing force of the bearing balls 223 against the inner and outer races) becomes so low that the main resonance frequency is reduced. When the pre-load contrariwise increases, the life of the bearing unit 22 is shortened (because the pressing force of the bearing balls 223 against the inner and outer races becomes high). Hence, it is, known that the performance of the actuator is lowered by the change of the pre-load applied to the bearing unit 22. Accordingly, a material lighter in specific gravity than stainless steel was unable to be used as the material of the sleeve 21 which was a part of the movable portion of the actuator.

JP-A-8-93758 is a literature concerning the rotating actuator and has described a technique of positively setting the linear expansion coefficient of the sleeve to be larger than the linear expansion coefficient of the shaft to thereby increase the pre-load applied to the bearing unit at the rise of the temperature. In the technique, however, there was no consideration of reduction of the main resonance frequency and shortening of the life of the bearing unit though there was an effect of cancelling reduction of rotation torque due to the viscosity change of grease in the bearing unit at the temperature change.

As described above, in the rotating actuator, when the sleeve of the pivot bearing was made of a material different in kind from that of the shaft, the change of the pre-load applied to the bearing unit at the temperature change was caused by the difference between linear expansion coefficients due to the difference in kind between the materials. Hence, there was a disadvantage in that reduction of controllability was caused by reduction of stiffness when, for example, the pre-load decreased and in that the life of the bearing unit was shortened when, for example, the pre-load increased. Hence, a material lower in specific gravity than stainless steel was unable to be used as the material of the sleeve in the rotating actuator. Hence, there was also a disadvantage in that it was difficult to lighten the weight of the rotating actuator as a whole to enhance controllability.

SUMMARY OF THE INVENTION

An object of the present invention is to eliminate the disadvantages from the aforementioned technique, that is, to provide a high-accuracy and large-capacity magnetic disk apparatus in which the weight of a pivotal moving portion of an actuator is reduced to enhance the head-positioning controllability of the actuator.

In order to achieve the above object, according to a first aspect of the present invention, there is provided with a magnetic disk apparatus comprising a magnetic disk, a magnetic head for writing data into and reading data from the magnetic disk, and a carriage pivoted on a pivot bearing while holding the magnetic head at its one end, the pivot bearing including a cylindrical sleeve serving as a fixed axle, bearing units each having an outer race fitted to the inside of the sleeve, bearing balls, and an inner race, and a shaft having the outside fitted to the inner races of the bearing units, wherein: a pre-load in an axial direction of the shaft is applied between the inner and outer races in each of the bearing units; and the specific gravity of the sleeve is set to be lower than that of the shaft.

According to a second aspect of the present invention, in the aforementioned magnetic disk apparatus, a pre-load in an axial direction of the shaft is applied between the inner and outer races in each of the bearing units; and the shaft and the sleeve are configured so that the quantity of the change of the pre-load due to the difference in thermal expansion between the shaft and the sleeve in the axial direction of the shaft cancels the quantity of the change of the pre-load due to the difference in thermal expansion between the shaft and sleeve in a radial direction of the shaft.

According to a third aspect of the present invention, in the aforementioned magnetic disk apparatus, the Young's modulus of the shaft of the pivot bearing is set to be larger than that of the sleeve. Further, according to a fourth aspect of the present invention, the shaft of the pivot bearing is made of stainless steel whereas the sleeve is made of an aluminum type material.

DESCRIPTION OF THE EMBODIMENTS

A magnetic disk apparatus according to an embodiment of the present invention will be described below. First, the principle of the present invention will be described with reference to a model shown in FIGS. 4A and 4B.

Figure 4A:
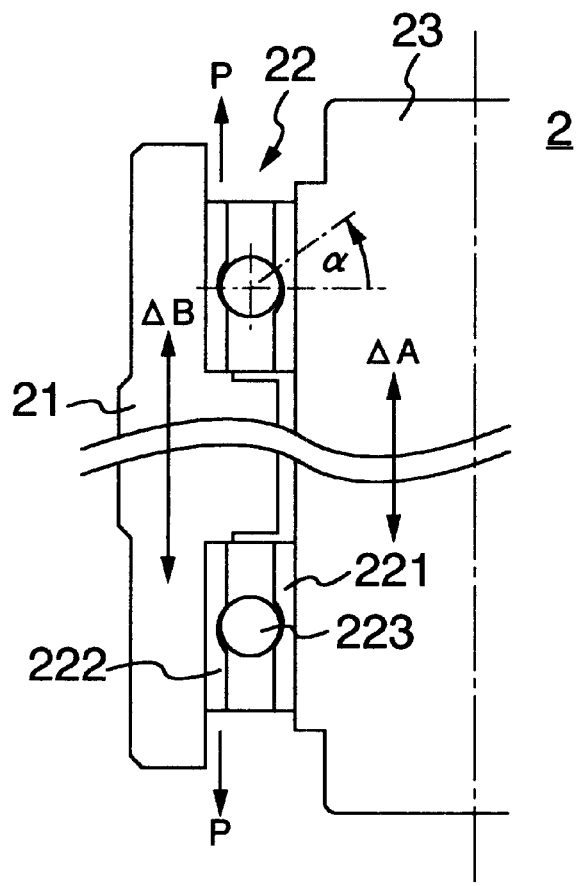
FIG. 4A is a schematic sectional view for explaining the change of the pre-load due to the change of the temperature of the pivot bearing in the present invention.

FIG. 4A is a view showing the relations among a shaft 23, a pair of bearing units 22 each having an outer race 222, bearing balls 223 and an inner race 221 and a sleeve 21 in a rotating actuator.

Figure 4B:
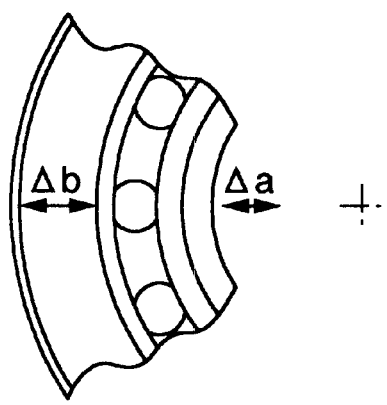
FIG. 4B is a partly cutaway view showing a schematic plane cross section of the bearing depicted in FIG. 4A.

Assuming now that the temperature rises in the condition that the shaft 23, the pair of bearing units 22 and the sleeve 21 constituting the pivot bearing 2 are made of one and the same material to be equalized in linear expansion coefficient. In this structure, it is understood that any relative positional difference is not generated between the inner and outer races 221 and 222 in each of the bearing units 22 because the quantity ΔA of thermal expansion of the shaft 23 and the quantity ΔB of thermal expansion of the sleeve 21 generated in an axial direction are equal to each other. Referring to FIG. 4B, in this structure, it is also understood that the pre-load little changes because the quantity Δa of thermal expansion of the shaft 23 and the quantity Δb of thermal expansion of the sleeve 21 generated in a radial direction are equal to each other.

Assuming now that the temperature rises in the condition in which: the shaft 23 and the sleeve 21 are made of different materials; the linear expansion coefficient of the sleeve 21 is larger than that of the shaft 23; and the contact angle a of each of the bearing balls 223 is positive (that is, a pre-load as an axially outward pressure in a direction of P is applied to the outer race relative to the inner race).

In the structure in this condition, the pre-load in the axial direction increases because the quantity ΔB of thermal expansion of the sleeve 21 becomes larger than the quantity ΔA of thermal expansion of the shaft 23 but the pre-load in the radial direction decreases because the quantity Δb of thermal expansion of the sleeve 21 becomes larger than the quantity Δa of thermal expansion of the shaft 23. As a result, the changes of the pre-load have a tendency to cancel each other. In other words, the sleeve 21 expands larger than the shaft 23 because of the difference in the quantity of thermal expansion between the shaft 23 and the sleeve 21. Hence, the contact angle of the bearing balls 223 with respect to the inner race 221 is reduced. Hence, the pressing force of the bearing balls 223 against the outer race 222 is reduced so that the pre-load P decreases. In the radial direction, however, the pre-load P increases because the shaft 23 expands larger than the sleeve 21. As a result, the changes of the pre-load have a tendency to cancel each other.

Specifically, if consideration is given to the contact angle a of the bearing balls 223 with respect to the inner and outer races 221 and 222, the linear expansion coefficients of the shaft 23 and the sleeve 21, the size and pitch of the bearing units 22 and the structure of the shaft 23 and the sleeve 21, the pre-load change due to the temperature change can be absorbed when the value of $(\Delta A - \Delta B)\tan\alpha - (\Delta a - \Delta b)$ is set to be sufficiently smaller than a value determined on the basis of the temperature range used and the required quantity of the pre-load change. Hence, different materials can be used as materials of the shaft 23 and the sleeve 21.

Figure 3:
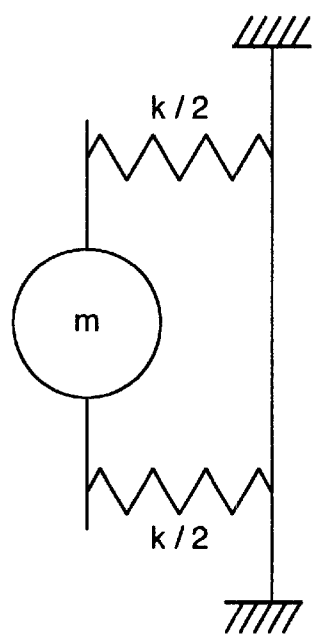
FIG. 3 is an explanatory view showing a model of a spring-mass system for explaining the sleeve and the shaft.

In the aforementioned configuration and condition, the weight of the sleeve can be reduced while the stiffness of the shaft 23 is secured. The main resonance frequency having the strongest influence on the controllability is the characteristic frequency of the system represented by the model shown in FIG. 3. The characteristic frequency f can be given by the expression:

$$f = 1/2\pi\sqrt{(k/m)}$$

in which k is a spring constant of the bearing units 22, and m is a mass of the movable portion of the actuator.

Figure 5:
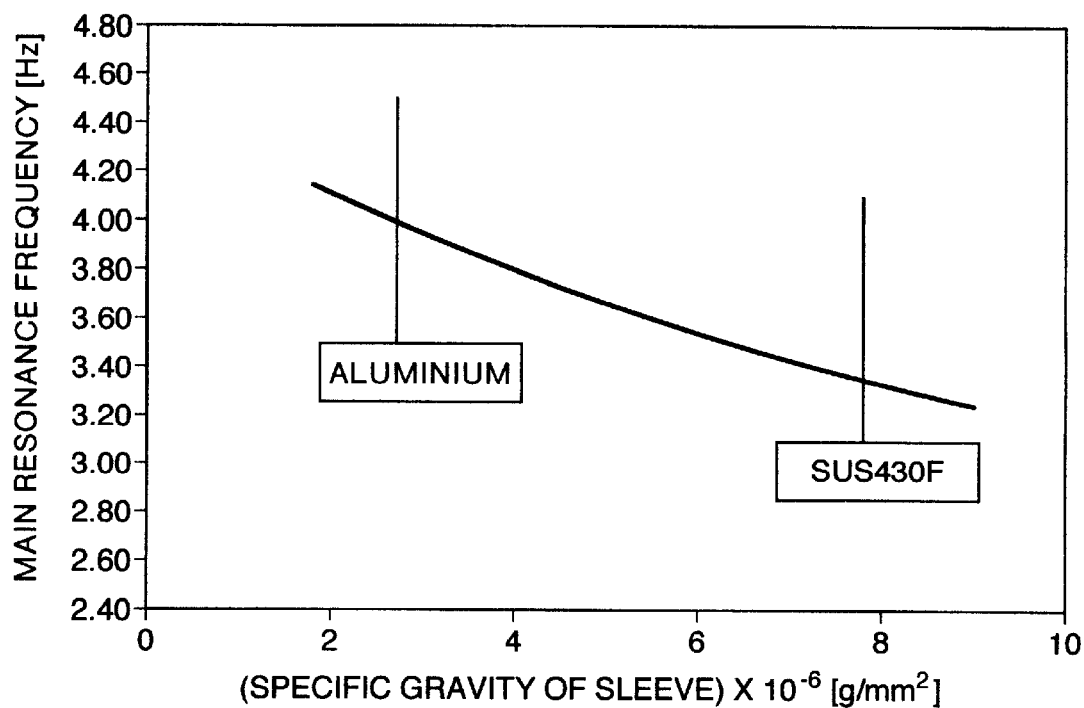
FIG. 5 is a graph showing the relation between the specific gravity of the sleeve and the main resonance frequency.

The expression shows that the main resonance frequency increases in inverse proportion to the square root of the mass of the movable portion of the actuator. When, for example, the sleeve 21 is made of stainless steel SUS430F with specific gravity of $7.8 \times 10^{-6}$ [g/mm$^2$], the mass of the sleeve 21 accounts for 45% of the whole mass and the main resonance frequency is 3.4 kHz, the relation between the specific gravity of the sleeve 21 and the main resonance frequency is as shown in FIG. 5. When the material of the sleeve 21 is changed to an aluminum type material with specific gravity of $2.7 \times 10^6$ [g/mm$^2$], the main resonance frequency is enhanced to 4 kHz.

As described above, according to the present invention, the main resonance frequency can be increased to raise the frequency range of positioning control of the magnetic head 4 to thereby enhance the positioning accuracy because the specific ravity of the sleeve 21 in the pivot bearing 2 is set to be lower than that of the shaft 23 and specifically because the relation $(\Delta A - \Delta B)\tan\alpha \approx (\Delta a - \Delta b)$ holds when ΔA is the quantity of thermal expansion of the shaft 23 of the pivot bearing 2 in the axial direction, Δa is a quantity of thermal expansion of the shaft 23 in the radial direction, ΔB is a quantity of thermal expansion of the sleeve in the axial direction, Δb is a quantity of thermal expansion of the sleeve in the radial direction, and a is a contact angle of the bearing balls 223. Also according to the present invention, seek time can be shortened because the enhancement of positioning accuracy brings enhancement of seek performance and recording density to reduce the moment of inertia in the movable portion of the actuator. Moreover, the structure of the pivot bearing 2 suppressing the change of the pre-load permits the sleeve 21 to be made of a material lower in specific gravity than the shaft 23 and different in kind from the material of the shaft 23. Hence, the stiffness of the shaft 23 can be kept high while the mass of the pivotally movable portion of the actuator can be reduced.

The structure of the actuator in the magnetic disk apparatus according to an embodiment of the present invention will be described below with reference to the drawings.

Figure 1:
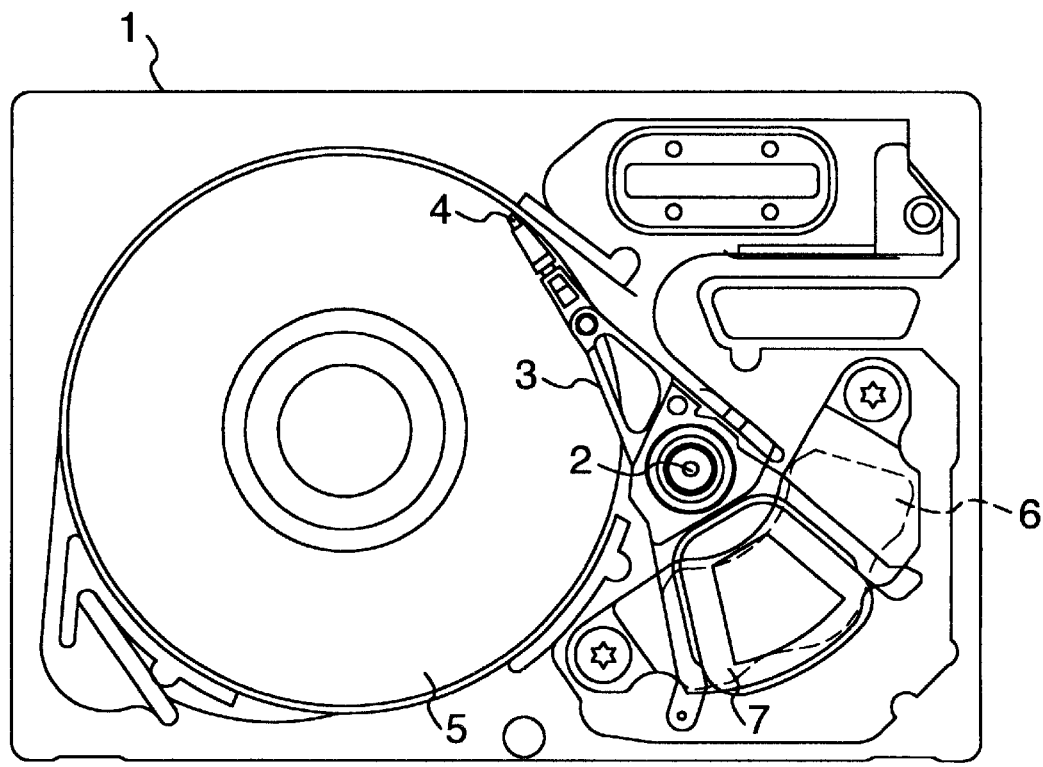
FIG. 1 is a plan view showing the structure of a magnetic disk apparatus according to the present invention.
Figure 2A:
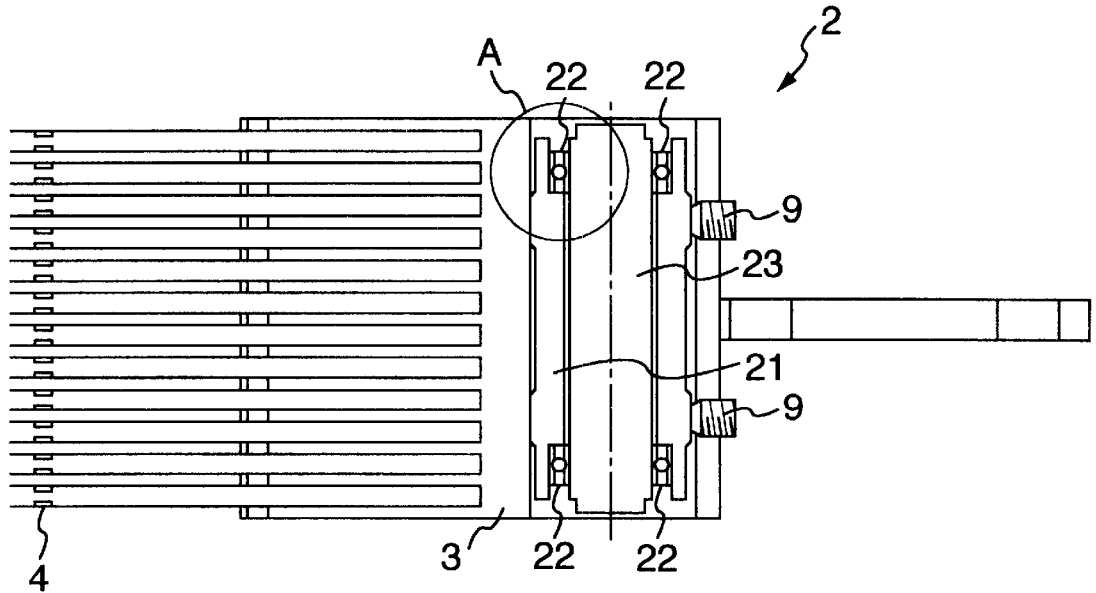
FIG. 2A is a schematic sectional view showing the actuator of the magnetic disk apparatus.
Figure 2B:
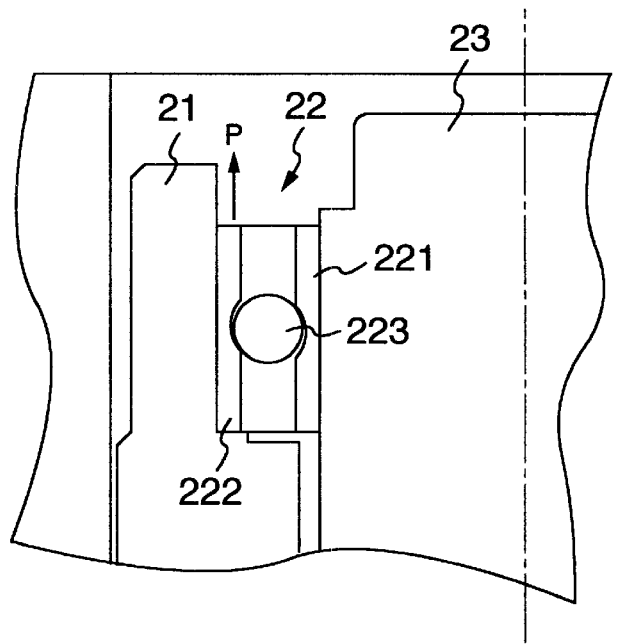
FIG. 2B is an enlarged view showing a circular portion A in FIG. 2A.

The structure of the actuator in this embodiment is schematically shown in FIG. 1. The actuator includes a carriage 3 with one end for supporting the magnetic head 4 and the other end connected to the coil 7, and a pivot bearing 2 for rotatably supporting the carriage 3. As shown in FIG. 2B, the pivot bearing 2 has: a columnar shaft 23 serving as a center of rotation; a cylindrical sleeve 21; a pair of bearing units 22 having outer races 222 fitted to upper and lower positions of the sleeve 21, and inner races 221 fitted to the outer side of the shaft 23 through bearing balls 223; and a carriage 3 fixed to the sleeve 21 by set-screws 9 and having one end connected to the magnetic head 4 and the other end connected to the coil 7.

As shown in FIG. 2B, each of the bearing units 22 is formed so that the bearing balls 223 are put between opposite recesses provided in the inside of the bearing outer and inner races 222 and 221. Each of the bearing units 22 is attached in the condition in which a pre-load P as an upward pressure in FIG. 2B is applied to the bearing outer race 222. That is, in a stage of production of the bearing units 22, the inner races 221 are adhesively fixed to the shaft 23 and the outer races 222 are adhesively fixed to the sleeve 21 in the condition in which the bearing units 22 are pressurized so that the distance between the inner races 221 is larger than the distance between the outer races 222. As a result, a pre-load P is applied initially.

Particularly in this embodiment, the material of the shaft 23 is stainless steel SUS303 and the material the sleeve 21 is aluminum A6061-T6. Incidentally, the materials are not limited thereto. Although the pivot bearing 2 is pressed against and fixed to the carriage 3 by the set-screws 9 (FIG. 2A), the pivot bearing 2 may be pulled and fixed by headed screws used as the screws or may be fixed by adhesion or forcing.

The linear expansion coefficient of the shaft 23 is $17.3 \times 10^{-6}$ [1/° C.]. The Young's modulus of the shaft 23 is 19,700 [kgf/mm$^2$]. The linear expansion coefficient of the sleeve 21 is $23.6 \times 10^{-6}$ [1/° C.]. The Young's modulus of the sleeve 21 is 7,000 [kgf/mm$^2$]. The materials are selected so that the linear expansion coefficient of the sleeve 21 is larger than that of the shaft 23 and that the Young's modulus of the shaft 23 is larger than that of the sleeve 21.

As described above, in this embodiment in which the magnetic disk apparatus 1 has the pivot bearing 2 composed of four members, namely, a shaft 23 permitting the carriage 3 to move in a radial direction of the magnetic disk 5, a pair of bearing units 22 and a sleeve 21, the specific gravity of the sleeve 21 of the pivot bearing 2 is set to be lower than that of the shaft 23 and the pivot bearing 2 is configured to satisfy the expression:

$$(\Delta A - \Delta B)\tan\alpha \approx (\Delta a - \Delta b)$$

in which ΔA is a quantity of thermal expansion of the shaft 23 of the pivot bearing 2 in the axial direction, Δa is a quantity of thermal expansion of the shaft 23 in the radial direction, ΔB is a quantity of thermal expansion of the sleeve 21 in the axial direction, Δb is a quantity of thermal expansion of the sleeve 21 in the radial direction, and a is a contact angle of the bearing balls 223.

In the actuator structure of the magnetic disk apparatus 1 configured as described above, when the temperature rises, the pre-load increases in the axial direction with respect to the direction of the initial pre-load P but decreases in the radial direction. When the temperature contrariwise falls, the pre-load decreases in the axial direction with respect to the direction of the initial pre-load P but increases in the radial direction. As a result, the change of the pre-load in the axial direction cancels the change of the pre-load in the radial direction, so that the change of the pre-load can be suppressed as a whole. That is, the main resonance frequency can be increased to raise the frequency range of positioning control of the magnetic head 4 to thereby enhance positioning accuracy because the specific gravity of the sleeve 21 of the pivot bearing 2 is set to be lower than that of the shaft 23 and specifically because the relation $(\Delta A - \Delta B)\tan\alpha \approx (\Delta a - \Delta b)$ holds when ΔA is a quantity of thermal expansion of the shaft 23 of the pivot bearing 2 in the axial direction, Δa is a quantity of thermal expansion of the shaft 23 in the radial direction, ΔB is a quantity of thermal expansion of the sleeve 21 in the axial direction, Δb is a quantity of thermal expansion of the sleeve 21 in the radial direction, and α is a contact angle of the bearing balls 223.

Also in this embodiment, the mass of the movable portion of the actuator can be reduced to shorten seek time because an aluminum type material is used as the material of the sleeve 21. Moreover, the stiffness of the shaft 23 can be kept equal to that of the shaft because stainless steel is used as the material of the shaft 23. In addition, the linear expansion coefficient of the sleeve 21 can be made approximately equal to that of the carriage 3, so that deformation due to the difference in thermal expansion between the sleeve 21 and the carriage 3 can be suppressed.

What is claimed is:

1. A magnetic disk apparatus, comprising a magnetic disk, a magnetic head for writing data into and reading data from said magnetic disk, and a carriage pivoted on a pivot bearing while holding said magnetic head at its one end, said pivot bearing including a cylindrical sleeve, bearing units each having an outer race fitted to an inner side of said sleeve, bearing balls, and an inner race, and a fixed axle shaft having an outer side fitted to said inner races of said bearing units, wherein:

a pre-load in an axial direction of said shaft is applied between said inner and outer races in each of said bearing units; and a specific gravity of said sleeve is set to be lower than that of said shaft.

2. A magnetic disk apparatus according to claim 1, wherein a Young's modulus of said shaft of said pivot bearing is set to be larger than that of said sleeve.

3. A magnetic disk apparatus according to claim 1, wherein a material of said shaft of said pivot bearing includes stainless steel and a material of said sleeve includes an aluminum type material.

4. A magnetic disk apparatus according to claim 1, wherein said sleeve is made entirely of a same material.

5. A magnetic disk apparatus comprising a magnetic disk, a magnetic head for writing data into and reading data from said magnetic disk, and a carriage pivoted on a pivot bearing while holding said magnetic head at its one end, said pivot bearing including cylindrical sleeve, bearing units each having an outer race fitted to an inner side of said sleeve, bearing balls, and an inner race, and a fixed axle shaft having an outer side fitted to said inner races of said bearing units, wherein:

a pre-load in an axial direction of said shaft is applied between said inner and outer races in each of said bearing units; and said shaft and said sleeve are configured such that a quantity of change of said pre-load due to a difference in thermal expansion between said shaft and said sleeve in said axial direction of said shaft cancels a quantity of change of said pre-load due to a difference in thermal expansion between said shaft and sleeve in a radial direction of said shaft.

6. A magnetic disk apparatus according to claim 5, wherein a specific gravity of said sleeve is set to be lower than a specific gravity of said shaft.

7. A magnetic disk apparatus according to claim 5, wherein a coefficient of thermal expansion of a material of said sleeve is higher than a coefficient thermal expansion of a material of said shaft.

8. A magnetic disk apparatus according to claim 7, wherein said material of shaft includes stainless steel and the material of said sleeve includes an aluminum type material.

9. A magnetic disk apparatus according to claim 5, wherein said sleeve is made entirely of a same material.

10. A magnetic disk apparatus, comprising a spindle for rotating a magnetic disk, a housing for supporting said rotating spindle, a magnetic head for writing information into and reading information from said magnetic disk, a pivot bearing constituted by four members including a carriage for supporting said magnetic head, a shaft permitting said carriage to move in a radial direction of said magnetic disk, a pair of bearing units, and a sleeve, wherein a specific gravity of said sleeve of said pivot bearing is set to be lower than that of said shaft wherein each of the bearing units has an outer race fitted to an inner side of said sleeve, bearing balls, and an inner race, said shaft having an outer side fitted to said inner race, and a pre-load in an axial direction of said shaft is applied between said inner and outer races in each of said bearing units.

11. A magnetic disk apparatus according to claim 10, wherein said sleeve is made entirely of a same material.

12. A magnetic disk apparatus, comprising a magnetic disk, a magnetic head for writing data into said reading data from said magnetic disk, and a carriage pivoted on a pivot bearing while holding said magnetic head at its one end, said pivot bearing including a cylindrical sleeve, bearing units each having an outer race fitted to an inner side of said sleeve, bearing balls, and an inner race, and a fixed axle shaft having an outer side fitted to said inner races of said bearing units, wherein:

a pre-load in an axial direction of said shaft is applied between said inner and outer races in each of said bearing units; and a specific gravity of said sleeve is set to be lower than that of said shaft; and said pivot bearing satisfies an expression, $$(\Delta A - \Delta B) \tan \alpha = (\Delta a - \Delta b)$$

in which $\Delta A$ is a quantity of thermal expansion of said shaft of said pivot bearing in an axial direction of said shaft, $\Delta a$ is a quantity of thermal expansion of said shaft in a radial direction of said shaft, $\Delta B$ is a quantity of thermal expansion of said sleeve in said axial direction, $\Delta b$ is a quantity of thermal expansion of said sleeve in said radial direction, and $a$ is a contact angle of said bearing balls.

13. A magnetic disk apparatus according to claim 12, wherein a Young's modulus of said shaft of said pivot bearing is set to be larger than that of said sleeve.

14. A magnetic disk apparatus according to claim 12, wherein a coefficient of thermal expansion of a material of said sleeve is higher than a coefficient thermal expansion of a material of said shaft.

15. A magnetic disk apparatus according to claim 14, wherein the material of said shaft includes stainless steel and the material of said sleeve includes an aluminum type material.

16. A magnetic disk apparatus, comprising a magnetic disk, a magnetic head for writing data into and reading data from said magnetic disk, and a carriage pivoted on a pivot bearing while holding said magnetic head at one end thereof, said pivot bearing including a cylindrical sleeve, bearing units each having an outer race fitted to an inner side of said sleeve, bearing balls, and an inner race, and a fixed axle shaft having an outer side fitted to said inner races of said bearing units, wherein:

a pre-load in an axial direction of said shaft is applied between said inner and outer races in each of said bearing units; and a coefficient of thermal expansion of a material of said sleeve is set to be higher than a coefficient of thermal expansion of a material of said shaft.

17. A magnetic disk apparatus according to claim 16, wherein a Young's modulus of said shaft of said pivot bearing is set to be larger than a Young's modulus of said sleeve.

18. A magnetic disk apparatus according to claim 17, wherein a material of said shaft of said pivot bearing includes stainless steel and a material of said sleeve includes an aluminum type material.

19. A magnetic disk apparatus according to claim 16, wherein said sleeve is made entirely of a same material.

20. A magnetic disk apparatus, comprising a magnetic disk, a magnetic head for writing data into and reading data from said magnetic disk, and a carriage pivoted on a pivot bearing while holding said magnetic head at its one end, said pivot bearing including a cylindrical sleeve, bearing units being provided at least at two places along an axial direction of said cylindrical sleeve, said bearing units each having an outer race fitted to an inner side of said sleeve, bearing balls, and an inner race, and a fixed axle shaft having an outer side fitted to said inner races of said bearing units, and said bearing units being pressurized so that a distance between said inner races is larger than a distance between said outer races, wherein:

a pre-load in an axial direction of said shaft is applied between said inner and, outer races in each of said bearing units; and a specific gravity of said sleeve is set to be lower than that of said shaft.

21. A magnetic disk apparatus, comprising a magnetic disk, a magnetic head for writing data into and reading data from said magnetic disk, and a carriage pivoted on a pivot bearing while holding said magnetic head at its one end, said pivot bearing including a cylindrical sleeve, bearing units being provided at least at two places along an axial direction of said cylindrical sleeve, said bearing units each having an outer race fitted to an inner side of said sleeve, bearing balls, and an inner race, and a fixed axle shaft having an outer side fitted to said inner races of said bearing units, and said bearing units being pressurized so that a distance between said inner races is larger than a distance between said outer races, wherein:

a pre-load in an axial direction of said shaft is applied between said inner and outer races in each of said bearing units; and said shaft and said sleeve are configured such that a quantity of change of said pre-load due to a difference in thermal expansion between said shaft and said sleeve in said axial direction of said shaft cancels a quantity of change of said pre-load due to a difference in thermal expansion between said shaft and sleeve in a radial direction of said shaft.

22. A magnetic disk apparatus, comprising a spindle for rotating a magnetic disk, a housing for supporting said rotating spindle, a magnetic head for writing information into and reading information from said magnetic disk, a pivot bearing constituted by four members including a carriage for supporting said magnetic head, a shaft permitting said carriage to move in a radial direction of said magnetic disk, a pair of bearing units, and a sleeve, said pair of bearing units such having an outer race fitted to an inner side of said sleeve, bearing balls and an inner race and said shaft having an outer side fitted to said inner races of said ring units, and said bearing units being pressurized so that a distance between said inner races is larger than a distance between said outer races, wherein:

a specific gravity of said sleeve of said pivot bearing is set to be lower than that of said shaft and a pre-load in an axial direction of said shaft is applied between said inner and outer races in each of said bearing units.

* * * * *